Oct. 15, 1963 J. J. HITT 3,107,309

TRANSISTOR SWITCHING CIRCUIT

Filed Sept. 7, 1961 3 Sheets-Sheet 1

TRANSISTOR SWITCHING CIRCUIT

Filed Sept. 7, 1961 3 Sheets-Sheet 3

United States Patent Office 3,107,309

Patented Oct. 15, 1963

3,107,309

TRANSISTOR SWITCHING CIRCUIT

James J. Hitt, Willow Grove, Pa., assignor to Leeds and Northrup Company, Philadelphia, Pa., a corporation of Pennsylvania Filed Sept. 7, 1961, Ser. No. 136,587
6 Claims. (Cl. 307—88.5)

This invention relates to transistor switching circuits and has for an object the provision of a monostable multivibrator having its quasi-stable state determined by a portion of the charging cycle of a capacitor.

Monostable multivibrators of the type having one normally stable state and one quasi-stable state have been extensively used in pulse circuitry where the time duration of the quasi-stable state has been utilized to provide a fixed time delay period. A triggering signal induces transition from the stable state to the quasi-stable state in which state the multivibrator remains for the time delay period. It then returns to its stable state with no external signal being required. In such monostable multivibrators, a pair of cross-connected vacuum tubes have been used with one of the tubes conductive and the other non-conductive during the stable state and with the conductivity states reversed during the quasi-stable state. The plate of the normally non-conductive tube is capacitor-coupled to the grid of the normally conductive tube, the coupling capacitor normally being in a charged state. In the quasi-stable state, the capacitor begins to discharge. The multivibrator remains in its quasi-stable state until the capacitor reaches a predetermined point in its discharge cycle, at which time the tubes switch back to their initial conductivity states for return to the stable states.

With the multivibrator returned to its stable state, the coupling capacitor must first be charged before transition may again be induced. Thus, the time required for charging the capacitor should be as short as possible in order to provide rapid "recovery." However, when transistors are, in the prior multivibrators, substituted for vacuum tubes, the time required for charging the coupling capacitor is a substantially large portion of the time duration of the quasi-stable state. The reason for this is that the circuit used for charging the coupling capacitor includes a load resistor provided for the normally non-conductive transistor. Thus, the charging time may not be decreased except by decreasing the value of either the load resistor or the coupling capacitor, or both, which values are limited by other considerations.

Another disadvantage of prior systems utilizing transistors is that they lack flexibility since the time duration of the quasi-stable state or delay period may not be substantially increased for the reason the discharge circuit of the coupling capacitor is shunted by the leakage resistance from base to ground of the transistor in its non-conductive state.

In accordance with the present invention, there is provided a monostable multivibrator having a coupling capacitor which is charged during the time the multivibrator is in its quasi-stable state and which is discharged when the multivibrator returns to its stable state from the quasi-stable state. In carrying out the present invention in one form thereof, a pair of transistors are cross-connected to provide the stable state with a first transistor of the pair normally conductive and a second transistor of the pair normally non-conductive and to provide a quasi-stable state when the conductivity states of the transistors are reversed. One of the cross-connections includes the coupling capacitor which is charged during the time the multivibrator is in its quasi-stable state. When the coupling capacitor acquires a predetermined charge, current flow through the second transistor in its conductive state is reduced to a value which causes it to switch from its conductive to its non-conductive state to return the multivibrator to its stable state.

With the multivibrator returned to its stable state, the coupling capacitor has a discharge path which includes the first transistor just rendered conductive and is independent of the second transistor just rendered non-conductive. Thus, the discharge path for the coupling capacitor is of low impedance compared with the impedance of the charging circuit producing the flow of charging current. The low-impedance discharge path results in a relatively short discharge time for the capacitor and a minimal recovery time for the multivibrator. In addition, a substantially long delay period may be achieved since the charging time of the capacitor may easily be increased to a maximum of several seconds, in a typical example, by providing a resistor of desired value in series in the charging circuit of the coupling capacitor.

In a preferred form of the invention, the coupling capacitor is connected between the collector of the normally conductive first transistor and the base of the normally non-conductive second transistor. In addition, a unidirectional device is connected between the base of the second transistor and ground. That device further decreases the impedance of the discharge path of the coupling capacitor and also protects the normally non-conductive transistor from an excess potential at its base. Further in accordance with the invention, an additional unidirectional device is connected between the collector of the normally conductive transistor and the coupling capacitor. That device provides a low impedance path therethrough only when the coupling capacitor acquires a predetermined charge.

For a more detailed disclosure of the invention and for further objects and advantages thereof, reference is to be had to the following description taken in conjunction with the accompanying drawings in which:

FIG. 1 schematically illustrates a monostable multivibrator embodying the invention;

Figure 2:
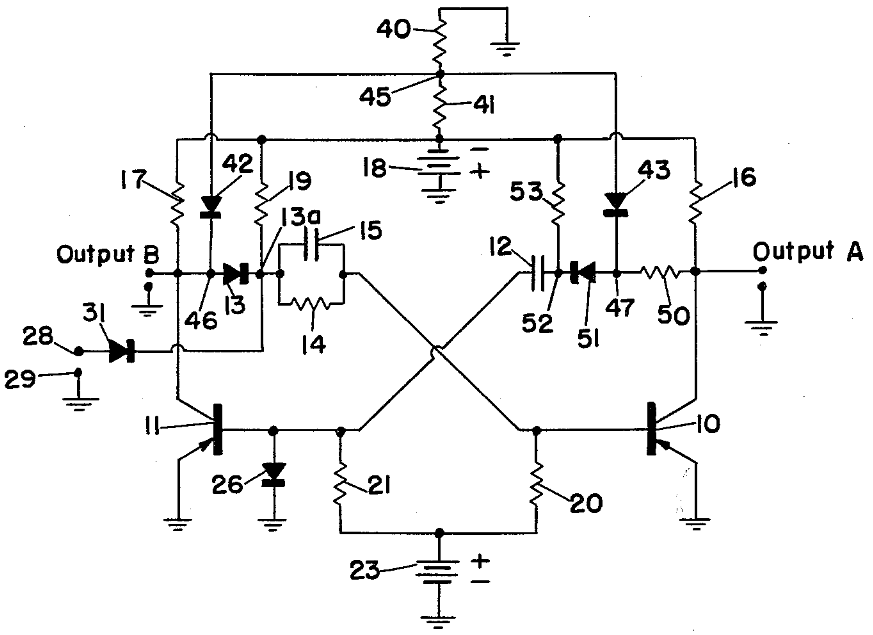
Figure 3:
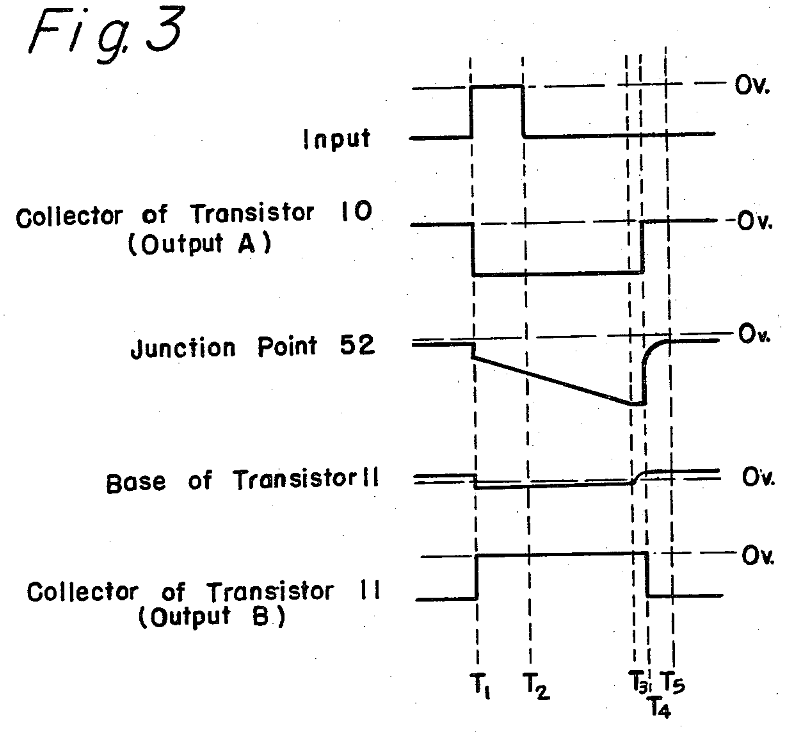
Figure 4:
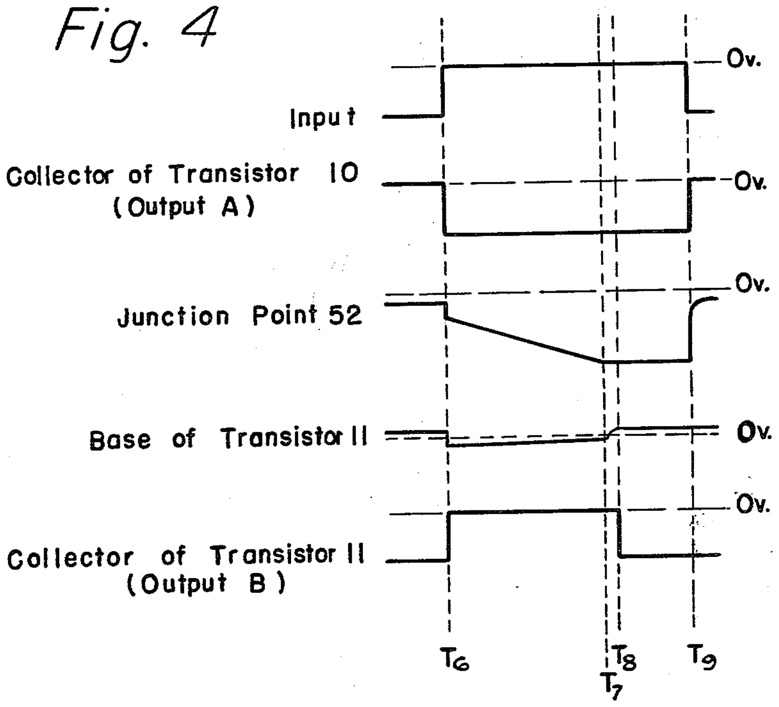

FIG. 2 schematically illustrates a further embodiment of the invention;

FIG. 3 illustrates the waveforms of the circuits of FIG. 2 when the input triggering signal is of shorter time duration than the time duration of the quasi-stable state; and FIG. 4 illustrates the waveforms of the circuit of FIG. 2 when the input triggering signal is of greater time duration than the time duration of the quasi-stable state.

Figure 1:
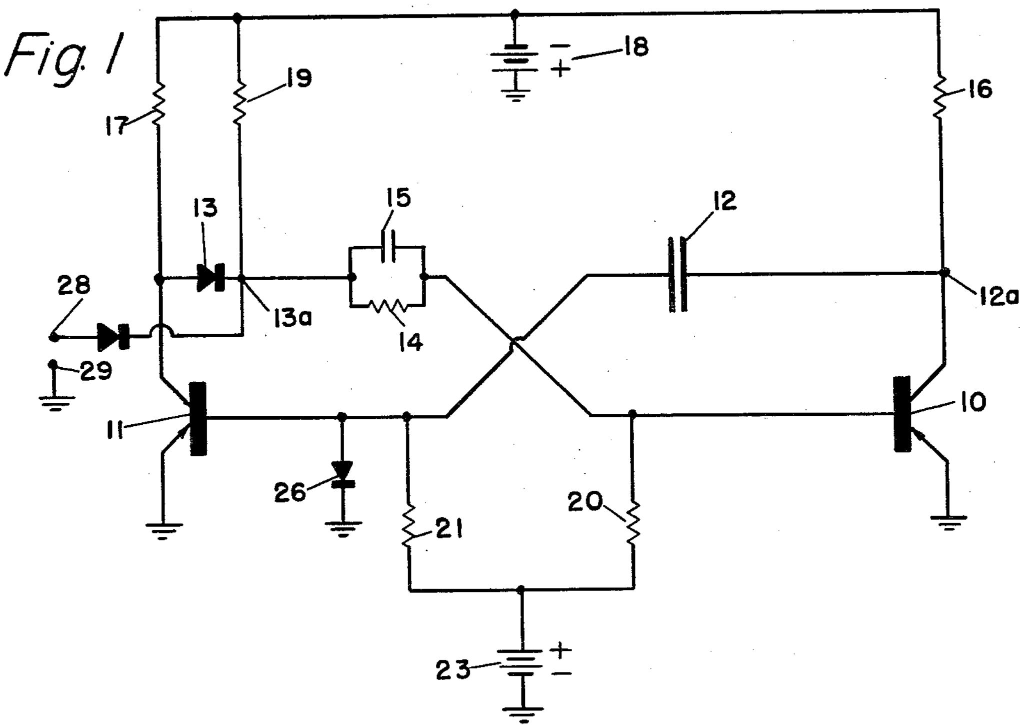
FIG. 1A is the same as FIG. 1 showing current flow during the stable state.
FIG. 1B is the same as FIG. 1 showing current flow during the quasi-stable state.

Referring now to FIG. 1, the invention in one form has been shown as comprising two transistors 10 and 11 of the PNP type preferably of the switching type adapted to computer applications, each of which has an emitter, a base and a collector. A coupling capacitor 12 is connected between the collector of transistor 10 and the base of transistor 11 and the collector of transistor 11 is coupled to the base of transistor 10 by way of a diode 13 in series-circuit relation with resistor 14 shunted by a commutating capacitor 15. The collectors of the transistors 10 and 11 are connected respectively by way of load resistors 16 and 17 to the negative side of a battery 18, while the positive side thereof is connected to ground. The negative side of battery 18 is also connected by way of resistor 19 to the junction point 13*a* which is the common connection of the diode 13, resistor 14 and capacitor 15. In addition, the bases of the transistors 10 and 11 are connected respectively by way of biasing resistors 20 and 21 to the positive side of the battery 23, the negative side of which is connected to ground.

In the stable state, the transistor 10 is normally conductive and the transistor 11 is maintained normally nonconductive. When transition is to be induced from the stable to the quasi-stable state, a positive-going input triggering signal or pulse is applied to the input terminals 28 and 29 which is effective to render non-conductive transistor 10. As transistor 10 is rendered non-conductive, the point 12a changes from approximately ground potential to the negative potential of battery 18. This abrupt change of potential across the capacitor 12 applies a switching pulse between the base and emitter of transistor 11 of direction which renders conductive that transistor. Current flows from the positive side of battery 18 to ground, through the emitter-base circuit of the transistor 11, the capacitor 12 and by way of resistor 16 to the negative side of the battery. With transistor 11 conductive, the potential at its collector and at the point 13a will be at approximately ground potential. This renders effective the bias battery 23 to apply a positive potential by way of resistor 20 to the base of transistor 10 relative to its emitter which, it is noted, is connected to ground. At the time transistor 10 is rendered non-conductive, the flow of current by way of capacitor 12 which developed the aforesaid switching pulse continues to flow and thus the capacitor 12 accumulates a charge with the charging current decreasing exponentially. When that current, which flows through the emitter-base circuit of transistor 11, decreases below a predetermined value, the transistor changes from a fully conductive state to a partially conductive state. As a result, the diode 13 is no longer forward biased, and the point 13a falls in a negative direction from its previously established ground potential. The result is the development of a switching pulse applied by way of capacitor 15 and resistor 14 to the emitter-base circuit of transistor 10. Thus, transistor 10 is rendered conductive to bring point 12a approximately to ground potential with immediate development of a positive pulse on transistor 11 to render it fully non-conductive. Thus, the capacitor 12 discharges through a low impedance path which may be traced from its positively charged left-hand plate, diode 26, the ground connection, the emitter, base and collector of transistor 10, and thence to the right-hand plate of capacitor 12. With the change from the reverse bias to the forward bias of diode 26 as transistor 10 is rendered conductive, the bias battery 23 then becomes effective through resistor 21 and diode 26 to maintain transistor 11 non-conductive.

By reason of the low impedance discharge path for the capacitor 12, the monostable multivibrator may be operated through another cycle of operation by the application of a further control pulse at terminals 28 and 29 without the time delays which have characterized monostable multivibrators of the prior art.

The detailed analysis of the operation can be best explained in terms of the current flow in the several branches and the shift of the current flow from one branch to the other as that multivibrator is switched from its stable state to its quasi-stable state and automatically returned to its stable state. Referring to FIG. 1A and again assuming that the multivibrator is in its stable state and transistor 10 is conductive and the transistor 11 non-conductive, the transistor 10 is maintained conductive as a result of current flow above a predetermined value, specifically from the positive side of battery 18 to ground, through the emitter-base circuit of transistor 10 and by way of resistors 14 and 19 to the negative side of battery 18. As long as the aforesaid "on" current, $I_{on}$, has a magnitude above said predetermined value, the transistor 10 is maintained conductive. It is to be noted that the battery 23 and resistor 20 provide a path for a current $I_1$ which adds to the current $I_{on}$ at the junction point 35 to produce a current $I_2$. The current $I_1$ flows by way of the positive side of the battery 23 through resistors 20, 14 and 19, battery 18 and by way of ground and to the negative side of the battery 23. It will also be observed that the reverse bias on diode 13 shifts the current $I_2$ from resistor 17 to resistor 19. A portion of the current $I_2$ charges the capacitor 15 with its right-hand plate positive with respect to its left-hand plate.

With transistor 10 conductive, there is provided a low impedance path from emitter to collector thereof so that a current $I_3$ flows from the positive side of battery 18, through ground, the emitter, base and collector of transistor 10, and thence through the resistor 16 to the negative side of battery 18.

The multivibrator being in its stable state, transistor 11 is maintained normally non-conductive by the application to its base of a positive bias relative to its emitter. That positive bias is provided by the potential drop in the forward direction across the conductive diode 26 which is connected between the base of transistor 11 and ground. Diode 26 is selected to have a forward direction potential drop of relatively low magnitude in order to provide a positive bias for transistor 11 of a low level for proper operation of that transistor. Current for the conductive diode 26 may be traced from the positive side of battery 23 (as current $I_4$) through resistor 21 and divides at junction point 24. A major portion of the current flows through the diode 26 and by way of ground to the negative side of the battery 23.

It is also to be observed that a minor portion of the current $I_4$ flows from the point 24 as leakage current into the base of the non-conductive transistor 11. That leakage current or $I_{leakage}$ further divides as base-collector leakage current and base-emitter leakage current. The base-emitter leakage current flows from the emitter to ground and then to the negative side of battery 23. The base-collector leakage current flows from the collector through resistor 17 and by way of battery 18 to ground and to the negative side of battery 23.

Figure 1A:
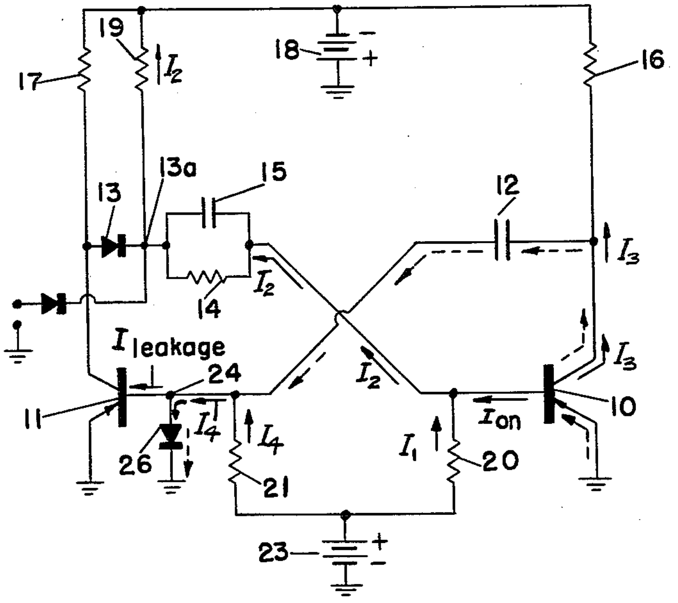
Figure 1B:
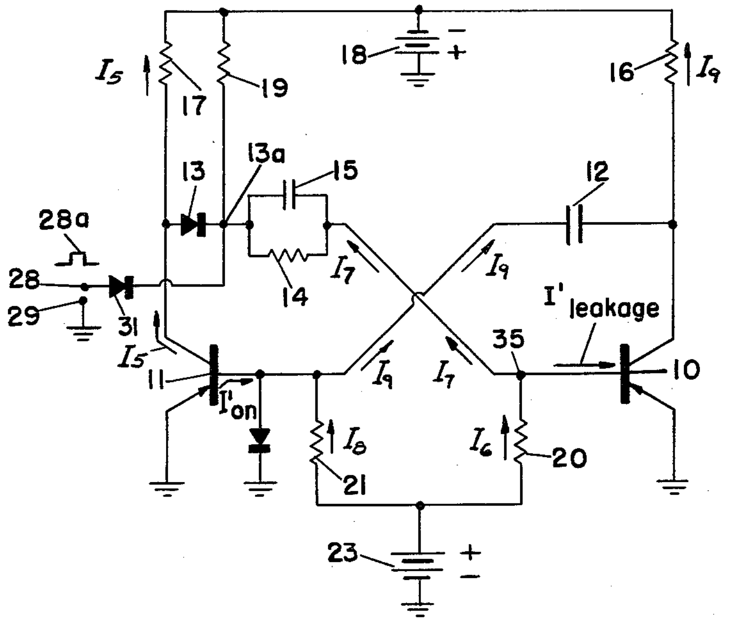

There has now been traced in the multivibrator current flow during the stable state. When the monostable multivibrator is to be switched or changed from its stable to its quasi-stable state, the positive-going triggering signal or pulse 28a is applied to the input terminals 28 and 29 as illustrated in FIG. 1B. Since the pulse 28a is positive-going from a negative value, its upper level is approximately at ground potential so that the diode 13 conducts and the point 13a, which is connected to the cathode of diode 13, is in this manner brought to approximately ground potential.

It will be remembered that during the stable state of the multivibrator the capacitor 15 was charged with its right-hand plate positive and its left-hand plate negative. Accordingly, the switching of the multivibrator is made independent of the character of the switching pulse 28a. As soon as that pulse forward-biases the diode 13, the charge on capacitor 15 is effective to develop a positive switching pulse between the base and emitter of transistor 10 immediately and rapidly to render it non-conductive. With the junction point 13a at approximately ground potential, it will also be observed that the battery 18 no longer supplies either current $I_2$ or the "on" current for the emitter-base circuit of transistor 10. Thus, transistor 10 is rendered non-conductive by current flowing into the base thereof, as well as by the cessation of "on" current. The current into the base may be traced from the positive side of battery 23 through resistor 20 and into the base of transistor 10. After transistor 10 is rendered non-conductive, the current into the base drops to a leakage value shown as $I'_{leakage}$ current for that transistor. The current $I'_{leakage}$ further divides as base-collector leakage current and base-emitter leakage current, the paths of which are similar to $I_{leakage}$ of FIG. 1A flowing into the base of transistor 11 when that transistor is non-conductive.

It is to be noted that the current flow $I_6$ through resistor 20 divides at junction point 35 and a major portion of that current, $I_7$, flows through the resistor 14 to the point 13a now at ground potential.

With transistor 10 non-conductive as a result of the input triggering pulse, transistor 11 is rendered conductive by means of flow of on current from the positive side of battery 18 to ground, through the emitter-base circuit of transistor 11 and by way of capacitor 12 and resistor 16 to the negative side of battery 18. That current flow renders conductive transistor 11 and also initiates the charging of the coupling capacitor 12. As long as the aforesaid on current or $I'_{on}$ is above a predetermined value, the transistor 11 is maintained conductive.

It is to be noted that battery 23 and resistor 21 provide a path for a current $I_8$ which adds to the current $I'_{on}$ to provide a current $I_9$. Since the emitter-base junction of a conductive transistor has very low impedance and the resistor 21 is high-valued (33K), the current $I'_{on}$ has a substantially higher value than $I_8$ so that $I'_{on}$ is approximately equal to $I_9$ and in this context $I_8$ may be neglected.

With transistor 11 conductive, there is provided a low impedance path from emitter to collector thereof so that a current $I_5$ flows from the positive side of battery 18 through ground, the emitter, base and collector of transistor 11 and then by way of the parallel paths consisting of resistor 17 and diode 13 in series with resistor 19, and thence to the negative side of battery 18. At the termination of the short duration positive-going input pulse, diode 13 remains conductive and junction point 13*a* is maintained at approximately ground potential which is the potential of the collector of transistor 11 in its conductive state.

As the coupling capacitor 12 accumulates a charge, the rate of change of the charge on the capacitor with respect to time decreases which results in a decrease in the value of the charging current or the current $I_9$ flowing through the capacitor 12. With $I_9$ decreasing, current $I'_{on}$ also decreases, and when the current $I'_{on}$ decreases below a predetermined value required to maintain transistor 11 conductive, that transistor is rendered not fully conductive.

With transistor 11 not fully conductive, the diode 13 is reverse-biased and the point 13*a* is no longer at substantially ground potential. Thus, the potential of point 13*a* is at some negative value and the base of transistor 10 (point 35) is also at a negative potential and transistor 10 is rendered conductive by means of the on current or current $I_{on}$ as illustrated in FIG. 1A. In this manner, transistor 10 is again conductive and transistor 11 is again non-conductive and the multivibrator has returned to its stable state from its quasi-stable state with no external signal being required.

With the multivibrator just returned to its stable state, the coupling capacitor 12 is in a charged state. The capacitor 12 is required to be discharged before transition may again take place in the multivibrator. In accordance with the present invention, there is provided a discharge path for the capacitor 12 which is of low impedance compared with the impedance of the charging circuit including the resistor 16 producing the flow of charging current. Specifically, the discharge path for the capacitor 12 is illustrated in FIG. 1A by the dotted line arrows and includes transistor 10 and diode 26 both just rendered conductive. This discharge path may be traced from the positively charged left-hand plate of capacitor 12, diode 26, ground, the emitter, base and collector of conductive transistor 10, and thence to the right-hand plate of capacitor 12. The aforesaid path is independent of the transistor 11 just rendered non-conductive. Since the conductive diode 26 and the conductive transistor 10 provide low impedance circuits to ground, the discharge time constant for the coupling capacitor 12 is of a very low order. Thus, there is an extremely short duration of recovery time before which a subsequent input triggering pulse may again be applied.

It is to be understood that the coupling capacitor 12 also discharges by way of its positively charged left-hand plate through resistor 21, battery 23, ground, and then by way of the emitter, base and collector of transistor 10 to the right-hand plate of the capacitor. Since the resistor 21 and the battery 23 are shunted by the diode 26, it may be seen that a major portion of the current flows through the diode and a minor portion through resistor 21 and battery 23.

With the above in mind, it will be understood that the time for charging the capacitor may be increased, thereby providing a longer delay period by increasing the value of resistor 16 or the value of the coupling capacitor 12 or both. The size of capacitor 12 has no upper limit. The value of resistor 16 is limited only by the gain of the transistor 10 and by leakage current, both of which limitations still allow a relatively large valued resistor 16.

Referring now to FIG. 2, there is shown a preferred form of the monostable multivibrator with the waveforms thereof illustrated in FIGS. 3 and 4. Many of the various components of the multivibrator of FIG. 2 are similar to those of the multivibrator of FIG. 1 and, therefore, have been identified with corresponding reference characters.

In order to more easily understand the operation of FIG. 2, there will first be described the operation of the clamping network comprising resistors 40 and 41 and diodes 42 and 43. The resistors 40 and 41 are connected in series as a voltage-divider between the negative side of battery 18 and ground. In this manner, the common point 45 of the resistors 40 and 41 is at an intermediate potential between the negative potential of the battery 18 and ground. The anodes of the diodes 42 and 43 are connected to point 45 and the diodes will conduct only when their cathodes (connected to junction points 46 and 47 respectively) have applied thereto a potential more negative than the potential at point 45. The resistors 40 and 41 are selected to have relatively low resistance values compared to the circuits connected to points 46 and 47. Thus, the potential at point 45 does not vary as the diodes 42 and 43 conduct and thus when those diodes conduct, it acts to "clamp" its potential on the points 46 and 47.

Junction point 47 has connected thereto one end of a resistor 50 and the anode of a diode 51. The other end of resistor 50 is connected to the collector of transistor 10 and the cathode of diode 51 is connected to junction point 52 and to the right plate of capacitor 12. A resistor 53, which is in the charging circuit of the capacitor 12, is connected between the negative side of the battery 18 and the point 52.

As previously described, when the multivibrator is in its stable state and the capacitor is discharged, a positive-going input triggering signal is applied to the input terminals 28 and 29 which is effective to render non-conductive transistor 10. With transistor 10 non-conductive, the collector thereof becomes more negative and approaches the negative potential of the battery 18. Since the collector of transistor 10 is connected to the point 47 by way of resistor 50, that point also becomes more negative until it falls slightly below the potential of the junction point 45. At that time, the diode 43 conducts and the point 47 is maintained at the negative potential of the point 45. Since the negative potential at the point 47 is applied to the anode of the diode 51, that diode is rendered and maintained non-conductive.

As already made clear, with transistor 10 rendered non-conductive, on current renders conductive transistor 11 and initiates the charging of the coupling capacitor 12. However, with diode 51 non-conductive, that on current may now be traced by way of resistor 53 to battery 18 rather than by way of resistor 16. More particularly, on current flows from the positive side of battery 18 to ground and through the emitter-base circuit of transistor 11, the coupling capacitor 12 and by way of resistor 53 to the negative side of battery 18.

As the coupling capacitor 12 accumulates charge, the aforesaid current decreases in value, thereby decreasing the potential drop across the resistor 53. With the potential drop decreasing across resistor 53, the point 52 becomes more negative until the potential at that point is slightly below the potential of point 47. At that time, the diode 51 is rendered conductive. The resistor 53 is then effectively shunted by diodes 51 and 43 and resistor 41. Since resistors 40 and 41 are of low values, resistor 53 is shunted by a low impedance, with the result that the potential difference across resistor 53 no longer decreases. Point 52 assumes substantially the potential as point 45. With the potential across the resistor 53 no longer decreasing, because clamped, the potential applied to the capacitor 12 no longer changes. Thus, the current flowing through the capacitor 12 diminishes rapidly to zero since that current is proportional to the rate of change of voltage with respect to time.

With the aforesaid current diminishing rapidly to zero, the current flow through the emitter-base circuit of the transistor 11 also rapidly diminishes to zero as a limit. As this transistor is rendered less and less conductive, the potential at the collector of transistor 11 becomes more and more negative. As it becomes negative, the diode 13 is back-biased and no longer conducts. The negative bias of the collector of transistor 11 is then effective through resistors 17 and 19 to apply a negative potential by way of the cross-connection including resistor 14 and capacitor 15 to the emitter-base circuit of transistor 10, thereby assisting in turning on that transistor. With transistor 11 rendered non-conductive, on-current is supplied to the emitter-base of transistor 10, thereby maintaining that transistor conductive for the termination of the quasi-stable state.

With the termination of the quasi-stable state, the multivibrator returns to its stable state and the charged coupling capacitor 15 is provided with a discharge path which is of low impedance compared with the impedance of the circuit including resistor 53 providing the flow of charging current. This discharge path may be traced from its positively charged left-hand plate, diode 26, ground, emitter, base and collector of transistor 10 and by way of resistor 50 and conductive diode 51 to the right-hand plate. Since the resistor 50 in the discharge circuit has a substantially lower value than the resistor 53 in the charging circuit, it is seen that the discharge path is of low impedance compared with the impedance of the charging circuit.

The foregoing operation of the monostable multivibrator of FIG. 2 will be more clearly seen upon examination of the waveforms of FIG. 3. Assuming the multivibrator of FIG. 2 is in its stable state, a positive-going triggering pulse is applied to the input terminals 28 and 29 at time $T_1$ and terminates at time $T_2$. At time $T_1$, transistor 10 is rendered non-conductive and the potential at its collector (output A) decreases or become more negative. In addition, at time $T_1$, the potential at junction point 52 decreases as does the potential at the base of transistor 11 until transistor 11 is rendered conductive. With transistor 11 conductive at time $T_1$, its collector potential (output B) increases or becomes more positive. In addition, the on current for transistor 11 is of a high value, thereby producing a large potential drop across the resistor 53 and a potential approximately at ground at the point 52.

As capacitor 12 accumulates a charge, the on current decreases and the potential drop across the resistor 53 also decreases as the potential at the base of transistor 11 increases. At time $T_3$, the potential of point 52 has decreased slightly below the potential at point 47 and diode 51 is rendered conductive. Thus, the potential of point 52 is held at the potential of points 47 and 45 and the capacitor 12 ceases to charge.

Between times $T_3$ and $T_4$, the on current for transistor 11 rapidly diminishes to zero and the base potential of that transistor rapidly becomes more positive as shown by that waveform. At times $T_4$, there is no longer provided sufficient on current to maintain conductive transistor 11 and it is rendered non-conductive as illustrated by the negative-going potential at output B. This switching action renders transistor 10 conductive as shown by the positive-going potential at output A.

In addition, at time $T_4$, the coupling capacitor 12 begins rapidly to discharge through the conductive transistor 10 and conductive diodes 26 and 51. Thus, the potential at the junction point 52 rapidly increases as capacitor 12 discharges until it is fully discharged at time $T_5$. It may now clearly be seen that the discharge time of capacitor 12 between times $T_4$ and $T_5$ is a small fraction of the time of the quasi-stable state or delay period between times $T_1$ and $T_4$.

It has been assumed in all of the above description that the input triggering signal or pulse has a time duration shorter than the time duration of the delay period determined by the charging of the coupling capacitor 12 and the nonconduction of transistor 11. In particular, in FIG. 3, the time duration of the input pulse extended from times $T_1$ to $T_2$ while the time duration of the quasi-stable state extended from times $T_1$ to $T_4$. Referring to FIG. 4, it will now be shown that the input triggering pulse may have a time duration from $T_6$ to $T_9$ which is of greater time duration than that of the quasi-stable state which extends from times $T_6$ to $T_8$.

It will be recalled that after the input pulse is applied and the multivibrator is in its quasi-stable state, the on current decreases in value and the potential at the point 52 becomes more negaive until diode 51 conducts. At that time, i.e., time $T_7$, junction 52 is held at the potential of points 47 and 45 and the base potential of transistor 11 rapidly increases until that transistor is rendered non-conductive. Accordingly, the potential at the collector of transistor 11 (output B) becomes more negative until diode 42 conducts and the potential at that collector is held at the potential of point 45.

As already made clear, the input triggering pulse applied to point 13*a* maintains transistor 10 non-conductive and diode 13 non-conductive. Transistor 10 is not rendered conductive until the termination of the input pulse at time $T_9$ at which time on current flows through that transistor rendering it conductive. With transistor 10 conductive, the capacitor 12 discharges therethrough and the potential at the point 52 rapidly increases and in like manner the potential at the collector of transistor 10 (output A) rapidly increases.

From the above, it may be seen that the pulse produced at output B is of a time duration equal to the quasi-stable state of the multivibrator, while the pulse produced at output A has a time duration equal to the time duration of the input pulse.

It will be understood that input triggering pulses or signals may be applied other than to point 13*a* of FIGS. 1 and 2. For example, a positive triggering pulse may be applied directly to the base of transistor 10 thereby rendering that transistor non-conductive or a negative triggering signal may be applied to the base of transistor 11 rendering that transistor conductive.

It is to be understood that transistors 10 and 11 may be of the NPN type, preferably of the switching type adapted to computer applications, with corresponding reversal of the polarity of the batteries 18 and 23 and the corresponding reversal of connections of the diodes in the input circuit. The polarity of the input pulses and the resultant polarity of the output waveforms will all be reversed from those described and illustrated for the PNP transistors 10 and 11. The unidirectional devices or diodes 13, 26, 31, 42, 43 and 51 are also all preferably adapted to computer applications. The resistors 14, 16, 17, 19, 20, 21, 40, 41, 50 and 53 and the voltages of the batteries 18 and 23 will be selected to suit the requirements of the particular transistors used. For the example used in the above description, these resistors and batteries may have the following values:

| Resistor— | Ohms |
| --- | --- |
| 14 | 1,800 |
| 16 and 17 | 12,000 |
| 19 | 6,200 |
| 20 | 9,100 |
| 21 | 33,000 |
| 40 | 1,200 |
| 41 | 1,000 |
| 50 | 1,000 |
| 53 | 7,870 |

| Battery— | Volts |
| --- | --- |
| 18 | 20 |
| 23 | 6 |

The principles of the invention having now been explained together with modifications thereof, it is to be understood that many more modifications may be made all within the spirit and scope of the following claims.

What is claimed is:

1. A monostable multivibrator having a stable and a quasi-stable state comprising first and second transistors each having at least an emitter, a base and a collector, means for normally maintaining conductive said first transistor and for normally maintaining non-conductive said second transistor to provide said stable state for said multivibrator, impedance means cross-connecting said collector of said second transistor and said base of said first transistor, means including a coupling capacitor in series-circuit relation with a diode cross-connecting said collector of said first transistor and said base of said second transistor, means for rendering conductive said second transistor and for rendering non-conductive said first transistor and said diode to provide said quasi-stable state for said multivibrator, a resistor having one end thereof connected to the common connection of said capacitor and said diode, charging means including a source of supply having a connection to the other end of said resistor for producing a charging current for flow through said capacitor when said diode is rendered non-conductive, said charging current when above a predetermined value maintaining said second transistor conductive, said charging current decreasing in value as said capacitor accumulates a charge, said diode being rendered conductive upon acquirement of a predetermined charge by said coupling capacitor, means for rapidly diminishing to zero as a limit said charging current when said diode is rendered conductive, said second transistor being rendered non-conductive when said charging current has decreased below said predetermined value, means for rendering conductive said first transistor when said second transistor is rendered non-conductive to return said multivibrator to its stable state, and means including an additional diode connected between said base of said second transistor and said emitter of said first transistor, whereby a discharge path is provided for said capacitor which includes said first transistor in its conductive state and said additional diode in its conductive state which path is of low impedance compared with the impedance of said charging means and said resistor.

2. A monostable multivibrator comprising a pair of transistors each having at least an emitter, a base and a collector, said transistors being cross-connected and arranged to provide a stable state when a first of said pair of transistors is fully conductive and the second of said pair is fully non-conductive and to provide a quasi-stable state when the conductivity states of the transistors are reversed, a coupling capacitor being included in the cross-connection between said collector of said first transistor and said base of said second transistor, an input circuit having applied thereto an input triggering pulse for rendering fully nonconductive said first transistor, means including a source of supply for applying a switching pulse to the emitter-base circuit of said second transistor for rendering it fully conductive when said first transistor is rendered fully non-conductive, said source of supply producing current flow through a charging circuit for said capacitor and including said emitter-base circuit of said second transistor, said coupling capacitor upon acquirement of a predetermined charge reducing said current flow through said emitter-base circuit of said second transistor, whereby said second transistor changes from a fully conductive state to a partially conductive state, means for applying a switching pulse to the emitter-base circuit of said first transistor for rendering it fully conductive when said second transistor changes to a partially conductive state, means for applying a switching pulse to said emitter-base circuit of said second transistor for rendering it fully non-conductive when said first transistor is rendered conductive, and discharge means including said first transistor in its fully conductive state providing a discharge path for said capacitor which is of low impedance compared with the impedance of said source of supply including said charging circuit.

3. The monostable multivibrator of claim 2 in which said discharge means includes a diode connected between the base of said second transistor and said emitter of said first transistor, which diode is rendered conductive when said first transistor is rendered conductive for discharge of said capacitor by way of said diode.

4. The monostable multivibrator of claim 2 in which said discharge means includes a unidirectional device connected between said first transistor and said coupling capacitor whereby said device and said first transistor in its conductive state provide a discharge path of low impedance compared with the impedance of the circuit charging said capacitor.

5. The monostable multivibrator of claim 2 in which there is provided a unidirectional device connected between the collector of said first transistor and said coupling capacitor for providing a low impedance path therethrough when said coupling capacitor acquires said predetermined charge.

6. The monostable multivibrator of claim 2 in which there is provided a diode connected in series-circuit relation with said coupling capacitor which is rendered conductive upon said acquirement by said coupling capacitor of said predetermined charge, and clamping means connected to the side of said diode remote from said capacitor for limiting the charge acquired by said capacitor when said diode is conductive whereby said current flow through said second transistor rapidly diminishes to zero as a limit.

References Cited in the file of this patent

UNITED STATES PATENTS

| | | |
| --- | --- | --- |
| 2,641,717 | Toth | June 9, 1953 |
| 2,837,663 | Walz | June 3, 1958 |
| 2,880,330 | Linvil et al. | Mar. 31, 1959 |
| 2,894,128 | Wilson | July 7, 1959 |
| 2,990,480 | Ellsworth | June 27, 1961 |